United States Patent
Okada et al.

(10) Patent No.: US 9,042,668 B2
(45) Date of Patent: May 26, 2015

(54) COLOR-INFORMATION BASED IMAGE COMPRESSION METHOD AND APPARATUS

(71) Applicants: Shigeru Okada, Kanagawa (JP); Kazuhiro Ohya, Kanagawa (JP); Katsuya Koyanagi, Kanagawa (JP); Minoru Sodeura, Kanagawa (JP); Shintaro Adachi, Kanagawa (JP); Zhenrui Zhang, Kanagawa (JP); Hiroyoshi Uejo, Kanagawa (JP)

(72) Inventors: Shigeru Okada, Kanagawa (JP); Kazuhiro Ohya, Kanagawa (JP); Katsuya Koyanagi, Kanagawa (JP); Minoru Sodeura, Kanagawa (JP); Shintaro Adachi, Kanagawa (JP); Zhenrui Zhang, Kanagawa (JP); Hiroyoshi Uejo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/099,408

(22) Filed: Dec. 6, 2013

(65) Prior Publication Data
US 2014/0093166 A1   Apr. 3, 2014

Related U.S. Application Data

(62) Division of application No. 13/245,441, filed on Sep. 26, 2011, now Pat. No. 8,842,928.

(30) Foreign Application Priority Data

Mar. 28, 2011   (JP) .................. 2011-069435

(51) Int. Cl.
G06K 9/36   (2006.01)
G06K 9/00   (2006.01)
H04N 1/41   (2006.01)
H04N 1/64   (2006.01)
H04N 1/56   (2006.01)

(52) U.S. Cl.
CPC ................. *H04N 1/41* (2013.01); *H04N 1/642* (2013.01); *H04N 1/56* (2013.01)

(58) Field of Classification Search
None
See application file for complete search history.

(56) References Cited

U.S. PATENT DOCUMENTS

| 5,038,392 | A | * | 8/1991 | Morris et al. ................. 382/175 |
| 5,463,702 | A | | 10/1995 | Trueblood |
| 5,485,287 | A | | 1/1996 | Nakamura et al. |
| 5,768,481 | A | | 6/1998 | Chan et al. |

(Continued)

FOREIGN PATENT DOCUMENTS

| EP | 442054 A2 * | 8/1991 | ............. G06F 15/40 |
| JP | 09-065143 A | 3/1997 | |

(Continued)

OTHER PUBLICATIONS

Communication dated Jul. 2, 2014 from the Japanese Patent Office in counterpart Japanese Patent Application No. 2011-069435.

(Continued)

*Primary Examiner* — Wenpeng Chen
(74) *Attorney, Agent, or Firm* — Sughrue Mion, PLLC

(57) ABSTRACT

An image processing apparatus includes the following elements. A document-type determining unit determines what type of document a document is on the basis of read information obtained as a result of reading the document by using a document reader. A compression-format setting unit sets, on the basis of the type of document determined by the document-type determining unit, a compression format used for generating image data from the read information. A generator compresses the read information by using the compression format set by the compression-format setting unit so as to generate image data corresponding to the document.

5 Claims, 14 Drawing Sheets

(56) References Cited

U.S. PATENT DOCUMENTS

| | | | |
|---|---|---|---|
| 6,252,994 B1* | 6/2001 | Nafarieh | 382/253 |
| 6,556,711 B2 | 4/2003 | Koga et al. | |
| 6,853,755 B2* | 2/2005 | Li | 382/239 |
| 7,139,433 B2* | 11/2006 | Li | 382/232 |
| 7,386,177 B2* | 6/2008 | Alasia et al. | 382/232 |
| 7,512,280 B2* | 3/2009 | Alasia et al. | 382/232 |
| 8,055,084 B2* | 11/2011 | Hasegawa et al. | 382/232 |
| 8,311,333 B2* | 11/2012 | Mori et al. | 382/181 |
| 8,319,987 B2* | 11/2012 | Maekawa | 358/1.15 |
| 8,605,335 B2* | 12/2013 | Yamada | 358/448 |
| 2005/0069170 A1* | 3/2005 | Alasia et al. | 382/100 |
| 2006/0029278 A1* | 2/2006 | Alasia et al. | 382/232 |
| 2007/0025627 A1* | 2/2007 | Hasegawa et al. | 382/239 |
| 2007/0110277 A1 | 5/2007 | Hayduchok et al. | |
| 2007/0201752 A1 | 8/2007 | Gormish et al. | |
| 2008/0013831 A1 | 1/2008 | Aoki | |
| 2008/0317348 A1 | 12/2008 | Saito | |
| 2009/0274363 A1* | 11/2009 | Dai | 382/164 |
| 2009/0304295 A1* | 12/2009 | Mori et al. | 382/239 |
| 2010/0002271 A1* | 1/2010 | Yamada | 358/448 |
| 2010/0033754 A1 | 2/2010 | Okita | |
| 2010/0058180 A1 | 3/2010 | Hirayama et al. | |
| 2011/0002014 A1 | 1/2011 | Tani et al. | |
| 2011/0075187 A1 | 3/2011 | Imine | |

FOREIGN PATENT DOCUMENTS

| | | |
|---|---|---|
| JP | 09-65152 A | 3/1997 |
| JP | 2003-317034 A | 11/2003 |
| JP | 2004172974 A | 6/2004 |
| JP | 2004-297212 A | 10/2004 |
| JP | 2005184236 A | 7/2005 |
| JP | 2008028717 A | 2/2008 |

OTHER PUBLICATIONS

Communication dated Sep. 18, 2014, issued by the Japanese Patent Office in counterpart Application No. 2011-069435.

* cited by examiner

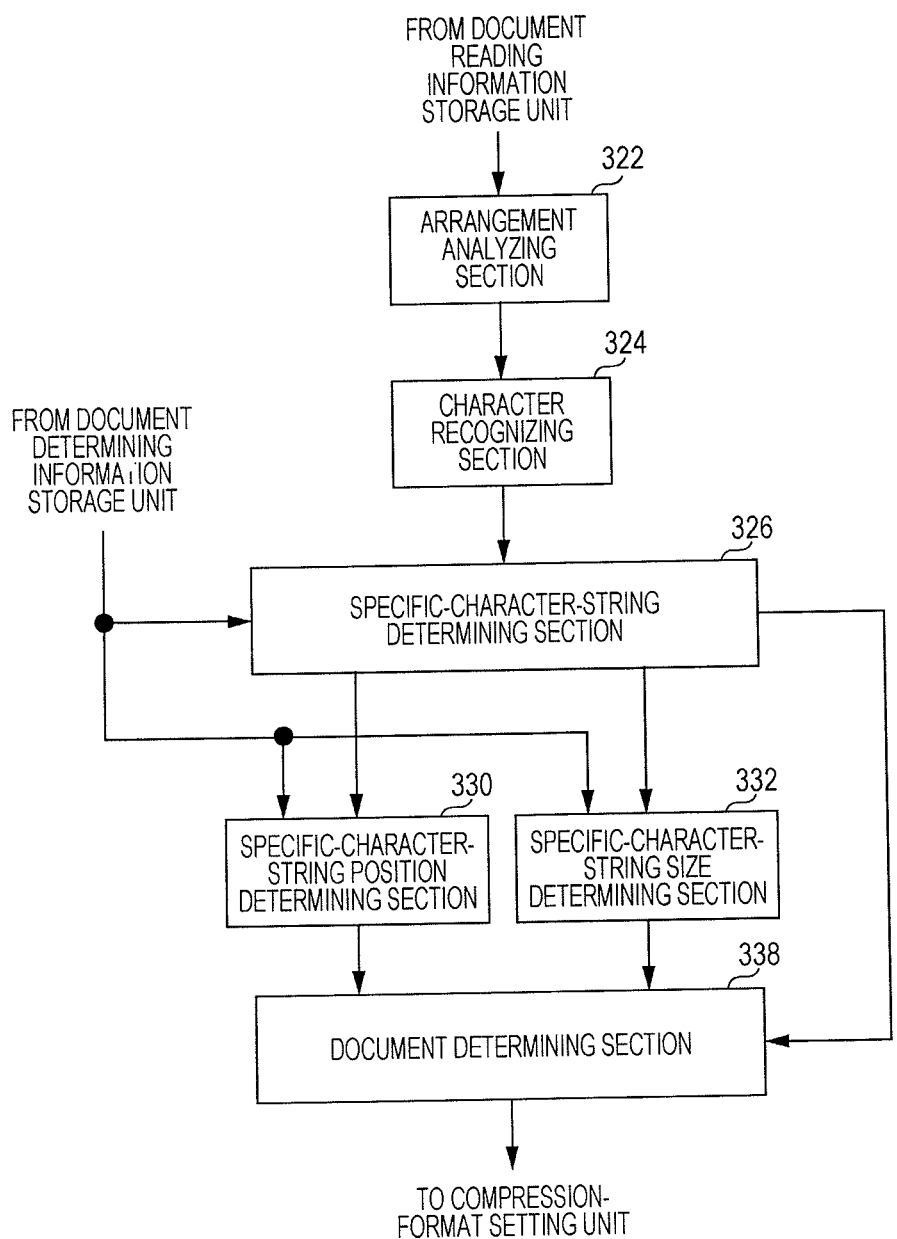

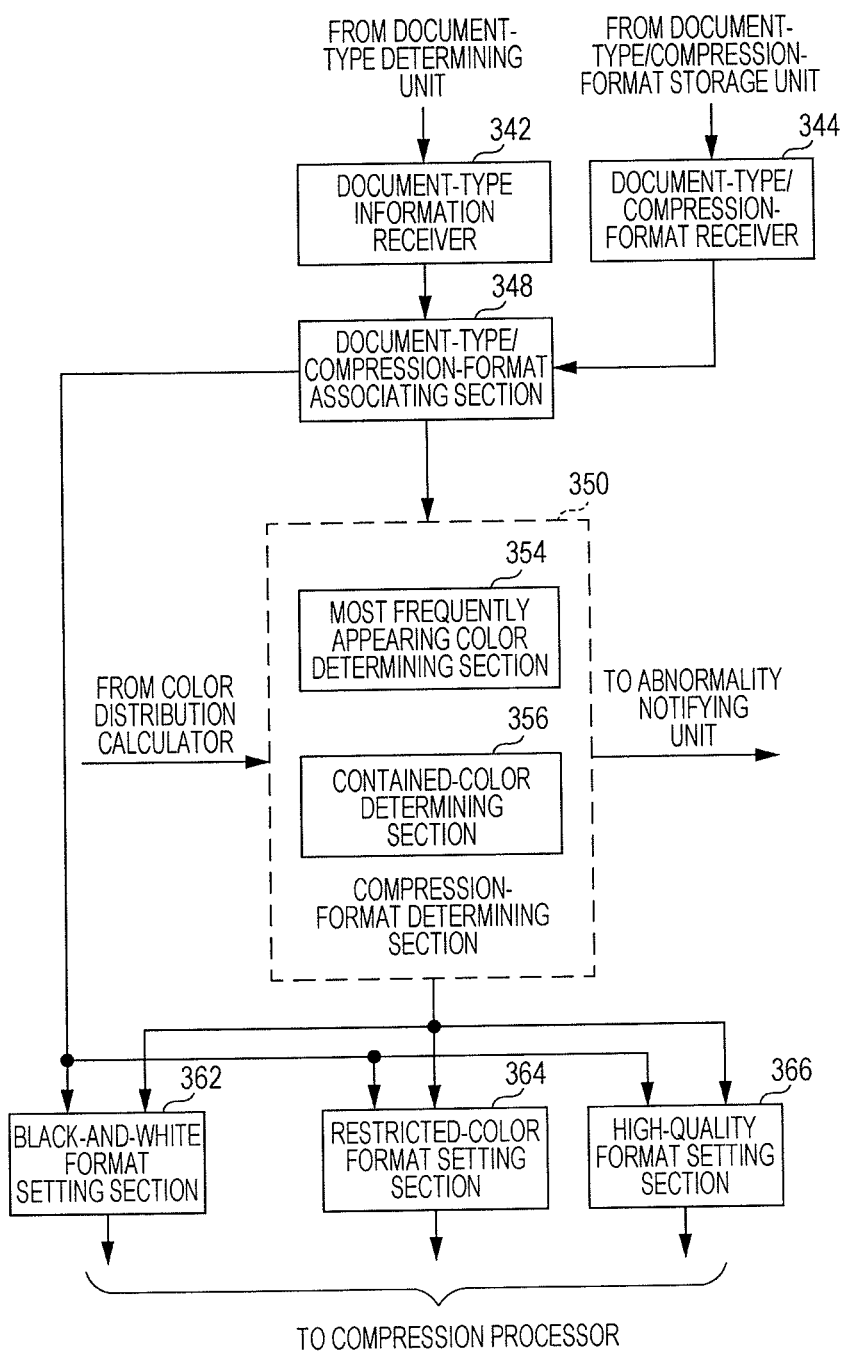

FIG. 5A

| DOCUMENT TYPE | SPECIFIC CHARACTER STRING | POSITION INFORMATION | SIZE INFORMATION |
|---|---|---|---|
| DOCUMENT A | "AAA" | POSITION INFORMATION #1 | SIZE INFORMATION #1 |
| DOCUMENT B | "BBB" | POSITION INFORMATION #2 | SIZE INFORMATION #2 |
| DOCUMENT C | "CCC" | POSITION INFORMATION #3 | SIZE INFORMATION #3 |
| DOCUMENT D | "DDD" | POSITION INFORMATION #4 | SIZE INFORMATION #4 |

FIG. 5B

| DOCUMENT TYPE | COMPRESSION FORMAT SETTING |
|---|---|
| DOCUMENT A | RESTRICTED-COLOR SETTING |
| DOCUMENT B | COLOR SETTING |
| DOCUMENT C | BLACK-AND-WHITE SETTING |
| DOCUMENT D | NO SETTING |
| DOCUMENT E | HIGH-QUALITY SETTING |

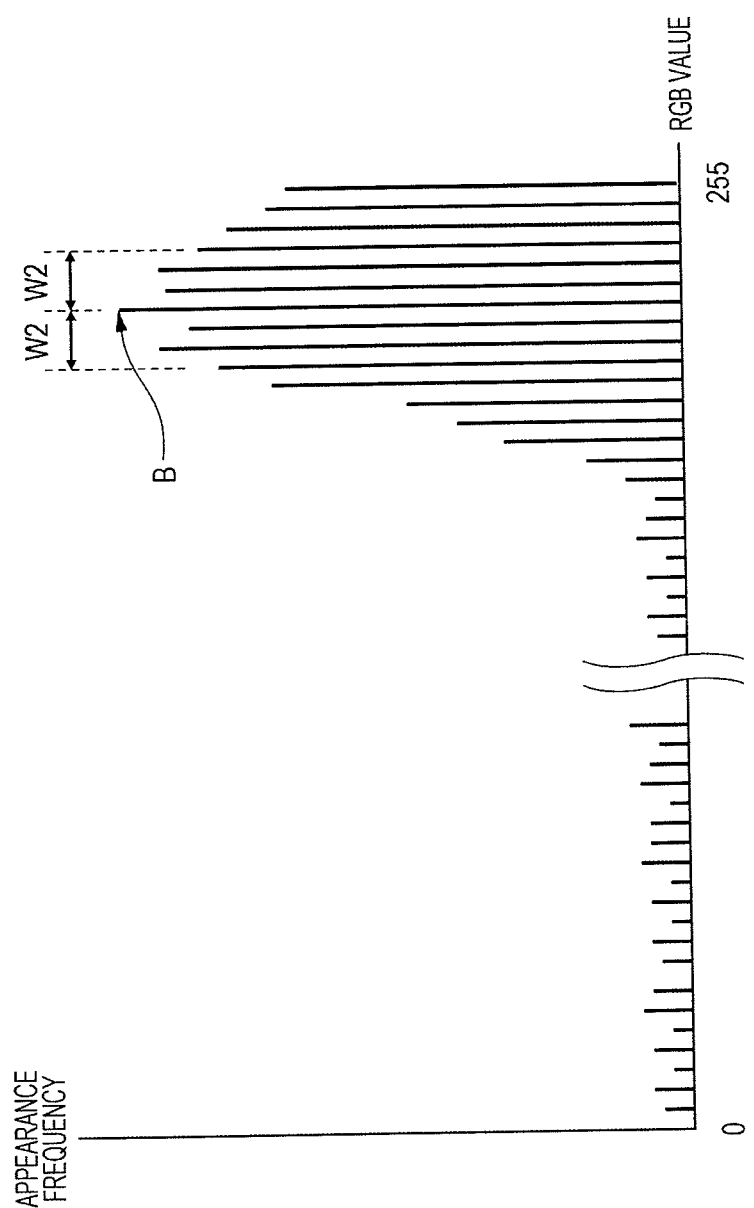

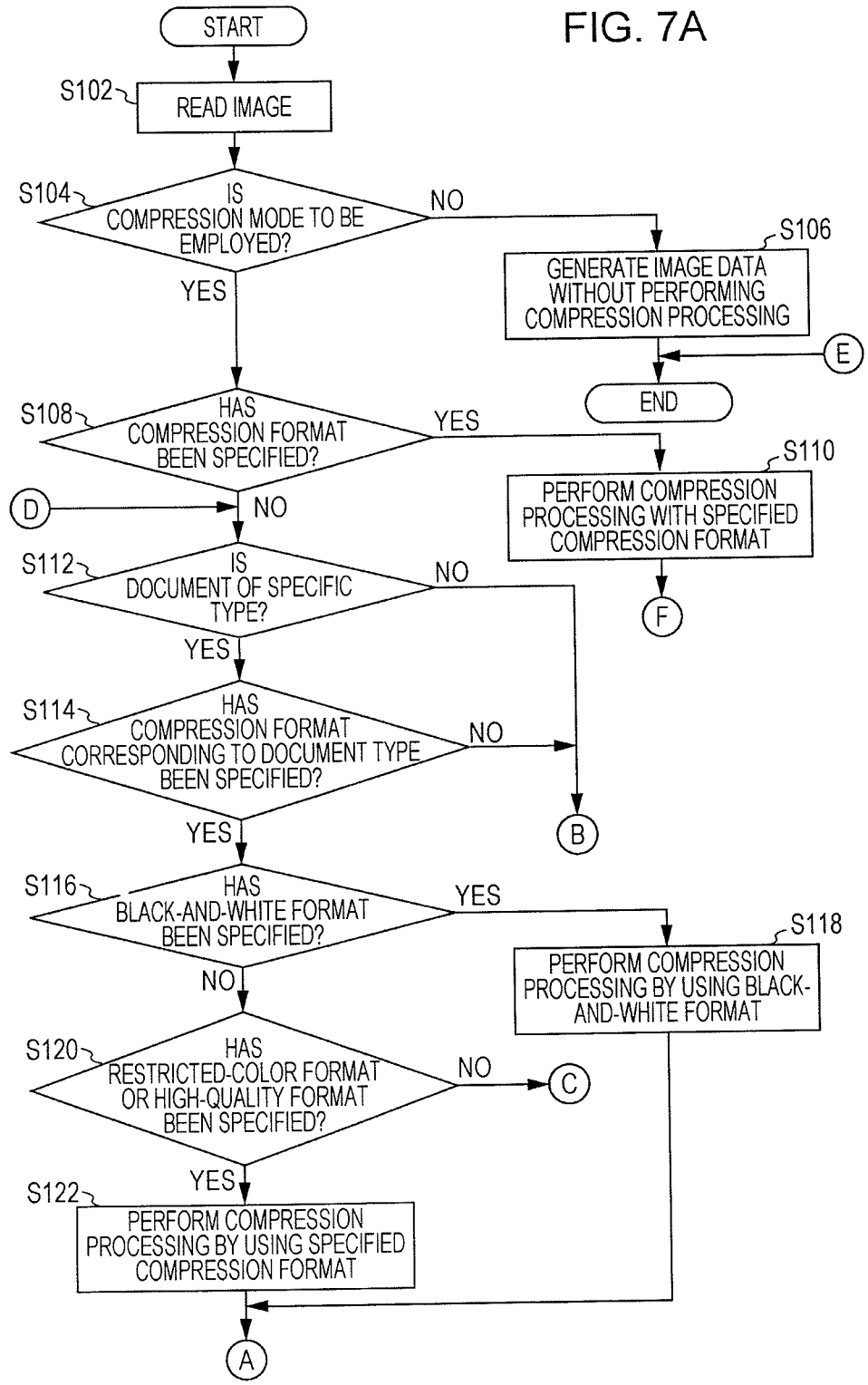

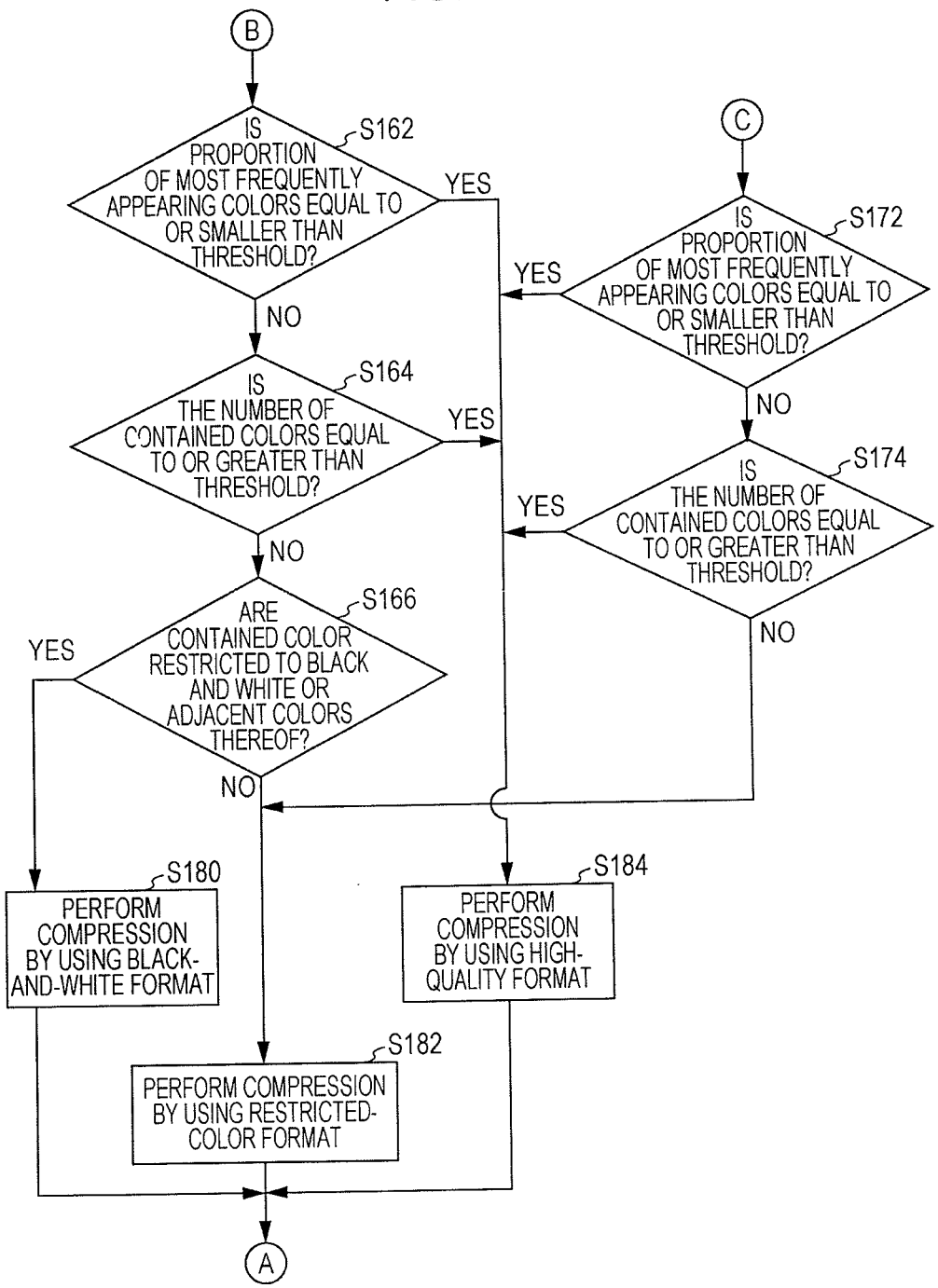

FIG. 8

ESTIMATE SHEET

TO ABC COMPANY

FROM XYZ COMPANY

| ESTIMATED PRICE | |
|---|---|

| MODEL | QUANTITY | UNIT PRICE | TOTAL PRICE |
|---|---|---|---|
| | | | |
| | | | |
| | | | |
| | | | |
| | | | |

| TOTAL | |
|---|---|

| APPROVED BY | | |
|---|---|---|
| DEPARTMENT MANAGER | SECTION MANAGER | PERSON IN CHARGE |
| | | |

E

COLOR-INFORMATION BASED IMAGE COMPRESSION METHOD AND APPARATUS

CROSS-REFERENCE TO RELATED APPLICATIONS

This application is a Divisional of U.S. patent application Ser. No. 13/245,441, filed on Sep. 26, 2011, which claims priority under 35 USC 119 from Japanese Patent Application No. 2011-069435 filed Mar. 28, 2011, the contents of all of which are incorporated herein by reference in their entirety.

BACKGROUND (i) Technical Field

The present invention relates to image processing apparatuses, image processing methods, and computer readable media.

SUMMARY

According to an aspect of the invention, there is provided an image processing apparatus including the following elements. A document-type determining unit determines what type of document a document is on the basis of read information obtained as a result of reading the document by using a document reader. A compression-format setting unit sets, on the basis of the type of document determined by the document-type determining unit, a compression format used for generating image data from the read information. A generator compresses the read information by using the compression format set by the compression-format setting unit so as to generate image data corresponding to the document.

BRIEF DESCRIPTION OF THE DRAWINGS

Exemplary embodiment(s) of the present invention will be described in detail based on the following figures, wherein:

FIG. 3 illustrates the configuration of a document-type determining unit shown in FIG. 2;

FIG. 4 illustrates the configuration of a compression-format setting unit shown in FIG. 2;

FIGS. 5A and 5B illustrate an example of document determining information and an example of document-type/compression-format association information, respectively;

FIG. 6 is a histogram illustrating processing performed by a most frequently appearing color determining section shown in FIG. 4;

FIGS. 7A through 7C are flowcharts illustrating processing executed by the processing program;

FIG. 8 illustrates a first document to be processed by the processing program in accordance with this exemplary embodiment;

DETAILED DESCRIPTION

Figure 1:
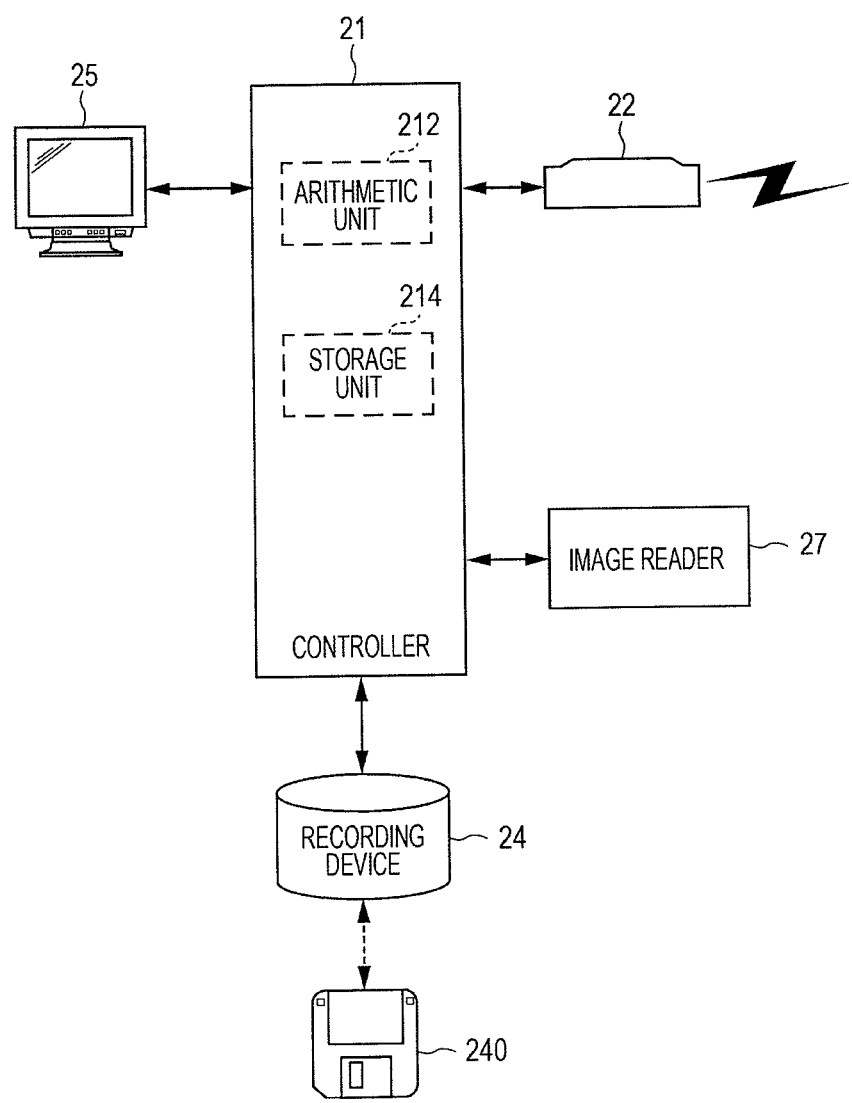
FIG. 1 illustrates an example of the hardware configuration of an image processing apparatus in accordance with an exemplary embodiment of the invention.

FIG. 1 illustrates an example of the hardware configuration of an image processing apparatus 2 in accordance with an exemplary embodiment of the invention.

The image processing apparatus 2 includes, as shown in FIG. 1, a controller 21, a communication device 22, a recording device 24, a user interface (UI) device 25, and an image reader 27. The controller 21 includes an arithmetic unit 212, such as a central processing unit (CPU), and a storage unit 214, such as a memory.

The UI device 25 includes a display unit, such as a liquid crystal display (LCD) unit or a cathode ray tube (CRT) display unit, and a keyboard or a touch panel.

The image reader 27 is, for example, a scanner, and reads an image, etc., from a recording medium, such as a document, and converts the read image into read information in the form of, for example, a bitmap.

That is, the image processing apparatus 2 has a hardware component, which serves as a computer and which is capable of performing information processing and communicating with another image processing apparatus or a terminal.

In the drawings, substantially the same components and steps are designated by like reference numerals and like step numbers.

In this exemplary embodiment, the image processing apparatus 2 includes the image reader 27. However, the image processing apparatus 2 may be a personal computer (PC) without an image reader, in which case, the image processing apparatus 2 may be connected to an image reader via a local area network (LAN).

Figure 2:
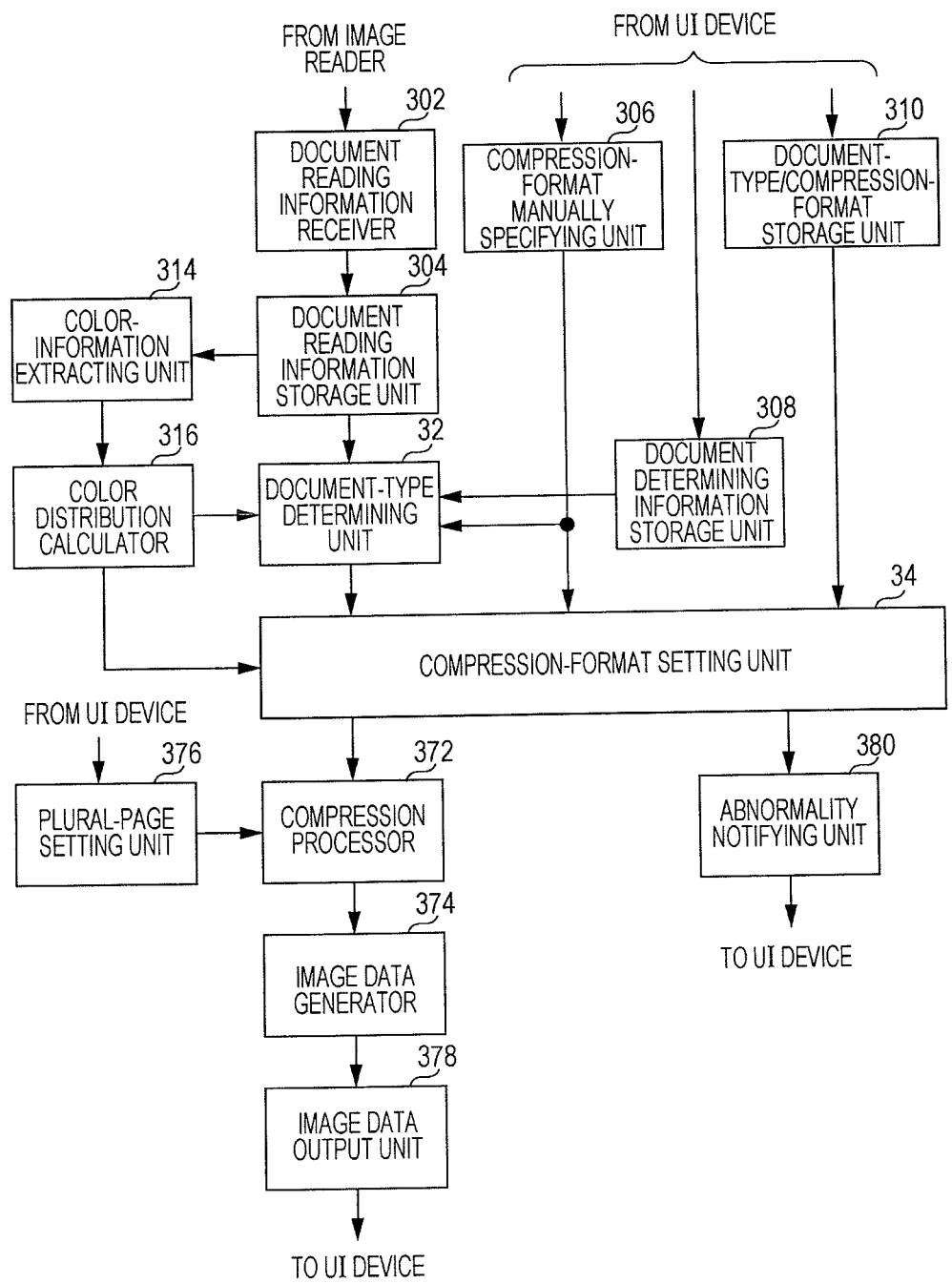
FIG. 2 illustrates the configuration of a processing program that is operated in the image processing apparatus shown in FIG. 1.

FIG. 2 illustrates the configuration of a processing program 3 that is operated in the image processing apparatus 2 shown in FIG. 1.

The processing program 3 includes, as shown in FIG. 2, a document reading information receiver 302, a document reading information storage unit 304, a compression-format manually specifying unit 306, a document determining information storage unit 308, a document-type/compression-format storage unit 310, a color-information extracting unit 314, a color distribution calculator 316, a document-type determining unit 32, a compression-format setting unit 34, a compression processor 372, an image data generator 374, a plural-page setting unit 376, an image data output unit 378, and an abnormality notifying unit 380.

The processing program 3 is supplied to the image processing apparatus 2 via, for example, a recording medium 240 (shown in FIG. 1). The processing program 3 is then loaded into the storage unit 214, and is executed on an operating system (OS) (not shown) installed in the image processing apparatus 2 by using a hardware resource of the image processing apparatus 2.

In this exemplary embodiment, the processing program 3 is implemented by software. However, the entirety or part of the functions of the processing program 3 may be implemented by hardware, such as a field programmable gate array (FPGA).

FIG. 3 illustrates the configuration of the document-type determining unit 32 shown in FIG. 2.

The document-type determining unit 32 includes, as shown in FIG. 3, an arrangement analyzing section 322, a character recognizing section 324, a specific-character-string determining section 326, a specific-character-string position determining section 330, a specific-character-string size determining section 332, and a document determining section 338.

FIG. 4 illustrates the configuration of the compression-format setting unit 34 shown in FIG. 2.

The compression-format setting unit 34 includes, as shown in FIG. 4, a document-type information receiver 342, a document-type/compression-format receiver 344, a document-type/compression-format associating section 348, a compression-format determining section 350, a black-and-white format setting section 362, a restricted-color format setting section 364, and a high-quality format setting section 366.

In the processing program 3, the document reading information receiver 302 receives reading information (document reading information) obtained from the image reader 27, and outputs the document reading information to the document reading information storage unit 304.

The document reading information storage unit 304 stores document reading information output from the document reading information receiver 302.

The compression-format manually specifying unit 306 receives compression-format manually specifying information obtained from a user through the use of the UI device 25 and outputs the received compression-format manually specifying information to the compression-format setting unit 34. The compression-format manually specifying information indicates regarding whether image data is to be generated by compressing document reading information in accordance with a predetermined compression format.

The compression-format manually specifying information includes an instruction to generate image data without compressing document reading information, an instruction to generate image data by compressing document reading information in accordance with a predetermined compression format, which will be discussed later, and an instruction to generate image data by compressing document reading information in accordance with a desired compression format.

The document determining information storage unit 308 stores document determining information, which will be discussed later with reference to FIG. 5A.

The document determining information is used for determining the type of read document, and is obtained from a user through the use of the UI device 25.

The document-type/compression-format storage unit 310 stores document-type/compression-format association information, which will be discussed later with reference to FIG. 5B.

The document-type/compression-format association information is used for setting a compression format in accordance with a document type, and is obtained from a user through the use of the UI device 25.

FIG. 5A illustrates an example of the document determining information, and FIG. 5B illustrates an example of the document-type/compression-format association information.

The document determining information includes, as shown in FIG. 5A, a document type indicating the type of document, a specific character string which characterizes the type of document, position information indicating an area surrounding the position of a specific character string, and size information indicating the area of a size of a specific character string.

The document-type/compression-format association information includes, as shown in FIG. 5B, a document type and a compression format which is to be set in accordance with a document type.

The color-information extracting unit 314 (FIG. 2) extracts color information corresponding to colors contained in a read document from document reading information stored in the document reading information storage unit 304.

The color distribution calculator 316 calculates the color distribution on the basis of the extracted color information.

If the color information is represented by an RGB three-dimensional color space, the color-information extracting unit 314 extracts color values, such as the luminance values, for each of the three colors, i.e., red (R), green (G), and blue (B), of each pixel from the document reading information.

In this case, the color distribution calculator 316 calculates the frequency with which the color values appear in the individual pixels, and generates a histogram indicating the relationship between the color values and the frequencies with which the color values appear.

A description will be given below when the color information is represented by an RGB three-dimensional color space. However, the color information may be represented by another color space, such as an L*a*b color space.

In the document-type determining unit 32, the arrangement analyzing section 322 (FIG. 3) analyzes document reading information so as to sort objects, such as characters, tables, non-artificial pictures, e.g., photographs, computer graphics (CG), and paintings, contained in a document. The arrangement analyzing section 322 then associates the sorted objects with position information.

This object sorting may be performed by detecting, for example, various lines, frame borders, ruled lines, color information, and edges, and by performing pattern matching. However, the object sorting technique is not restricted to this type.

The character recognizing section 324 analyzes document reading information by using, for example, an optical character recognition (OCR) function. In this case, the character recognizing section 324 performs morphological analysis so as to divide the document reading information into meaningful character strings of minimum size.

The character recognition is performed as follows. Image data representing characters obtained by reading a document is verified against patterns which are stored in advance so as to specify the characters and to generate character data (character strings).

The morphological analysis refers to the following processing. One sentence is sorted into morphemes (the smallest conceptual meaningful components) using a dictionary including information concerning grammar rules and words, which has been stored in advance, and the word classes of the sorted morphemes are determined.

The character recognizing section 324 calculates the positions of detected character strings so as to generate position information in which the character strings are associated with the positions.

The specific-character-string determining section 326 determines whether a specific character string contained in the document determining information supplied from the document determining information storage unit 308 is included in the character strings detected by the character recognizing section 324.

If a specific character string is included in the character strings detected by the character recognizing section 324, the specific-character-string determining section 326 outputs information concerning the detected specific character string to the specific-character-string position determining section 330 and the specific-character-string size determining section 332.

If a specific character string is not included in the character strings detected by the character recognizing section 324, the specific-character-string determining section 326 outputs that information (specific-character-string absence information) to the document determining section 338.

If the position of the specific character string is within an area surrounding the position indicated by the position information associated with the corresponding specific character string contained in the document determining information, the specific-character-string position determining section 330 generates information indicating that the position of the specific character string coincides with that contained in the position information, and outputs such information (position coincidence information) to the document determining section 338.

If the size of the specific character string is within an area of the size indicated by the size information associated with the corresponding specific character string contained in the document determining information, the specific-character-string size determining section 332 generates information indicating that the size of the specific character string coincides with that contained in the size information, and outputs such information (size coincidence information) to the document determining section 338.

If position coincidence information and size coincidence information have been generated for a certain specific character string, the document determining section 338 determines that the document corresponding to document reading information is a document related to that specific character string, and generates document-type information indicating the determined type of document corresponding to the document reading information.

Further, the document determining section 338 outputs the document-type information to the compression-format setting unit 34.

In contrast, if at least one of position coincidence information and size coincidence information has not been generated, or if specific-character-string absence information has been generated, the document determining section 338 generates document-type information indicating that the type of document corresponding to the document reading information is undetermined.

The above-described processing will be specifically described below with reference to FIG. 5A.

For example, it is now assumed that a specific character string "AAA" has been detected from document reading information by the specific-character-string determining section 326.

In this case, if the specific-character-string position determining section 330 determines that the position of the specific character string "AAA" is within an area surrounding the position indicated by position information #1, and if the specific-character-string size determining section 332 determines that the size of the specific character string "AAA" is within an area of the size indicated by size information #1, position coincidence information and size coincidence information are generated for the specific character string "AAA".

Accordingly, the document determining section 338 determines that the type of document corresponding to the document reading information is "document A".

In the above-described exemplary embodiment, when both position coincidence information and size coincidence information have been generated for a certain specific character string, the document determining section 338 determines the type of document containing that specific character string and generates document-type information. However, when one of position coincidence information and size coincidence information has been generated for a certain specific character string, the document determining section 338 may determine the type of document containing that specific character string.

In the above-described exemplary embodiment, the position information and the size information each have a certain area, and it is determined whether the position and the size of a specific character string are within the areas of the position information and the size information, respectively. Alternatively, the position information and the size information may each have a certain specific value. Then, as the position and the size of a specific character string are closer to the certain specific values, higher points may be given to the position and the size of the specific character string. If the total value of the points given to the position and the size exceeds a threshold, the document determining section 338 may determine the type of document containing that specific character string.

In the above-described exemplary embodiment, the type of document is determined on the basis of the position and the size of a specific character string. However, the type of document may be determined differently. For example, in order to determine whether the type of document is a design drawing, if a predetermined number of horizontal and vertical ruled lines are contained at a specific position (e.g., bottom right or top left), it may be determined that the type of document is a design drawing.

In the compression-format setting unit 34, the document-type information receiver 342 (FIG. 4) receives document-type information from the document-type determining unit 32, and outputs the received document-type information to the document-type/compression-format associating section 348.

The document-type/compression-format receiver 344 receives document-type/compression-format association information from the document-type/compression-format storage unit 310, and outputs the received document-type/compression-format association information to the document-type/compression-format associating section 348.

The document-type/compression-format associating section 348 determines the compression format corresponding to the type of document indicated by the document-type information on the basis of the document-type/compression-format association information.

Further, if the document-type/compression-format associating section 348 determines that the compression format is a black-and-white format, it instructs the black-and-white format setting section 362 to set a compression format. If the document-type/compression-format associating section 348 determines that the compression format is a restricted-color format, it instructs the restricted-color format setting section 364 to set a compression format. If the document-type/compression-format associating section 348 determines that the compression format is a high-quality format, it instructs the high-quality format setting section 366 to set a compression format.

The "black-and-white format setting" is the following data-compression setting. When generating image data, the colors to be expressed are restricted to only black and white.

The "restricted-color format setting" is the following data-compression setting. When generating image data, the number of colors to be expressed is restricted to a certain number of colors. The layer corresponding to each color is created and compressed as binary data so as to generate image data of a file format (e.g., portable document format (PDF)) that supports a multilayer structure.

The "high-quality format setting" is the following data-compression setting. When generating image data, objects, such as characters, photographs, and CG, are extracted from an original image. Then, layers are created and compressed in the formats suitable for the extracted objects, and the individual layers are then integrated so as to generate image data of a file format (e.g., PDF) that supports a multilayer structure.

That is, the number of reproduced colors of image data when compressing data representing document reading information is different depending on which compression format, i.e., the "black-and-white format setting", the "restricted-color format setting", or the "high-quality format setting", is employed. The larger number of reproduced colors is obtained in the order of the "high-quality format setting", the "restricted-color format setting", and the "black-and-white format setting". In the case of the use of the "high-quality setting", the largest number of colors is reproduced.

The "restricted color" refers to a single or plural typical colors extracted through calculations based on a histogram. In the case of the "restricted-color setting", pixels having colors other than predetermined restricted colors are each converted into a color which is closest to one of the restricted colors (whose color value is closest to the color value of one of the restricted colors) in the RGB color space. In this manner, by reducing the number of colors to the number of restricted colors, the compression ratio of the "restricted-color format setting" is higher than the "high-quality format setting".

If the document-type information does not indicate the type of document (i.e., if the type of document is undetermined), the document-type/compression-format associating section 348 outputs that information (type unspecified information) to the compression-format determining section 350.

If the document-type information indicates the type of document and if the corresponding compression format is the "color setting format", it means that any one of the "restricted-color format setting" and the "high-quality format setting" can be employed.

Thus, the document-type/compression-format associating section 348 outputs that information (color setting information) to the compression-format determining section 350.

The above-described processing will be specifically described with reference to FIG. 5B.

For example, if it is determined that the type of document is "document A", the document-type/compression-format associating section 348 instructs the restricted-color format setting section 364 to set a compression format so that the "document A" is to be compressed in accordance with the "restricted-color format setting".

If it is determined that the type of document is "document D", the document-type/compression-format associating section 348 outputs type unspecified information to the compression-format determining section 350 (FIG. 4).

If it is determined that the type of document is "document B", the document-type/compression-format associating section 348 outputs color setting information to the compression-format determining section 350.

In a case where the compression format has not been determined to one format by the document-type/compression-format associating section 348, the compression-format determining section 350 determines the compression format to be set.

The compression-format determining section 350 includes a most frequently appearing color determining section 354 and a contained-color determining section 356.

FIG. 6 is a histogram illustrating processing performed by the most frequently appearing color determining section 354.

In FIG. 6, the horizontal axis is the color value (e.g., luminance) of each of the RGB colors, and the vertical axis is the frequency with which pixels (number of pixels) appear with respect to each of the color values.

In this exemplary embodiment, a two-dimensional histogram illustrating the frequency of appearance of pixels with respect to the RGB value is shown as the color distribution. However, three histograms illustrating the frequencies of appearances of pixels with respect to the individual R, G, and B colors may be generated.

For easy representation, in this exemplary embodiment, a two-dimensional histogram is shown as the color distribution. However, a three-dimensional histogram may be generated so as to calculate and analyze the frequencies of appearances of pixels with respect to each of individual R, G, and B colors.

In this case, in the three-dimensional histogram, the number of pixels is associated with a color corresponding to each of the $256^3$ cubes which are formed into 256 partitions with respect to each of the three dimensions of the RGB three-dimensional space.

The most frequently appearing color determining section 354 specifies the color value corresponding to the most frequently appearing point, and sets the color values contained in a predetermined color value width starting from the most frequently appearing point to be the most frequently appearing colors.

More specifically, in the example shown in FIG. 6, the most frequently appearing color determining section 354 specifies the point B as the most frequently appearing point and sets the color values contained within a predetermined color value width W2 starting from the point B to be the most frequently appearing colors.

Then, the most frequently appearing color determining section 354 determines whether the proportion of the most frequently appearing colors in the entire document is equal to or smaller than a threshold (e.g., 80%).

If the proportion of the most frequently appearing colors is found to be equal to or smaller than the threshold, the most frequently appearing color determining section 354 instructs the high-quality format setting section 366 to set a compression format.

In contrast, if the most frequently appearing color determining section 354 determines that the proportion of the most frequently appearing colors is found to be greater than the threshold, the contained-color determining section 356 performs the following processing.

The contained-color determining section 356 samples and quantizes the histogram, and then, specifies the color value whose frequency of appearance is equal to or greater than a threshold and sets the color values contained within a predetermined range from the specified color value to be colors to be contained in a document (contained colors).

The contained-color determining section 356 also calculates the number of contained colors and determines whether the number of contained colors is equal to or greater than a threshold.

If the number of contained colors is equal to or greater than the threshold, the contained-color determining section 356 instructs the high-quality format setting section 366 to set a compression format.

If it is determined that the number of contained colors is smaller than the threshold and if color setting information has been output from the document-type/compression-format associating section 348, the contained-color determining section 356 instructs the restricted-color format setting section 364 to set a compression format.

If it is determined that the number of contained colors is smaller than the threshold and if color setting information has not been output from the document-type/compression-format associating section 348, the contained-color determining section 356 determines whether the contained colors are restricted to only black and white or to colors having the color values within a predetermined range from the black or white colors.

If the result of this determination is YES, the contained-color determining section 356 instructs the black-and-white format setting section 362 to set a compression format. If the result of this determination is NO, the contained-color determining section 356 instructs the restricted-color format setting section 364 to set a compression format.

The black-and-white format setting section 362 sets the compression format to be the black-and-white format, and outputs information concerning the set compression format to the compression processor 372.

The restricted-color format setting section 364 sets the compression format to be the restricted-color format and outputs information concerning the set compression format to the compression processor 372.

The high-quality format setting section 366 sets the compression format to be the high-quality format and outputs information concerning the set compression format to the compression processor 372.

In this exemplary embodiment, specific examples of the compression formats are the black-and-white format, the restricted-color format, and the high-quality format. However, the compression formats are not restricted to those types.

The compression processor 372 (FIG. 2) performs compression processing on the document read information in accordance with the compression format set by the black-and-white format setting section 362, the restricted-color format setting section 364, or the high-quality format setting section 366.

If the document includes plural pages, the plural-page setting unit 376 sets whether the second and subsequent pages follow the compression format set for the first page or whether the compression format is to be set for each page.

This setting may be obtained from a user through the use of the UI device 25.

If the document includes plural pages and if the second and subsequent pages follow the compression format set for the first page, the compression processor 372 compresses the second and subsequent pages with the compression format set for the first page.

In contrast, if the document includes plural pages and if the compression format is to set for each page, the compression processor 372 controls the document-type determining unit 32 and the compression-format setting unit 34 to perform the above-described processing.

The image data generator 374 generates image of, for example, a PDF format, for the information subjected to compression processing. If the document includes plural pages, image data is generated by combining plural pages subjected to compression processing.

The image data output unit 378 displays the generated image data on the UI device 25, which serves as a display device.

If the compression format has not been determined by the compression-format determining section 350, the abnormality notifying unit 380 displays warning information on the UI device 25, which serves as a display device, or causes the UI device 25, which serves as a speaker, to issue a warning.

Figure 7B:
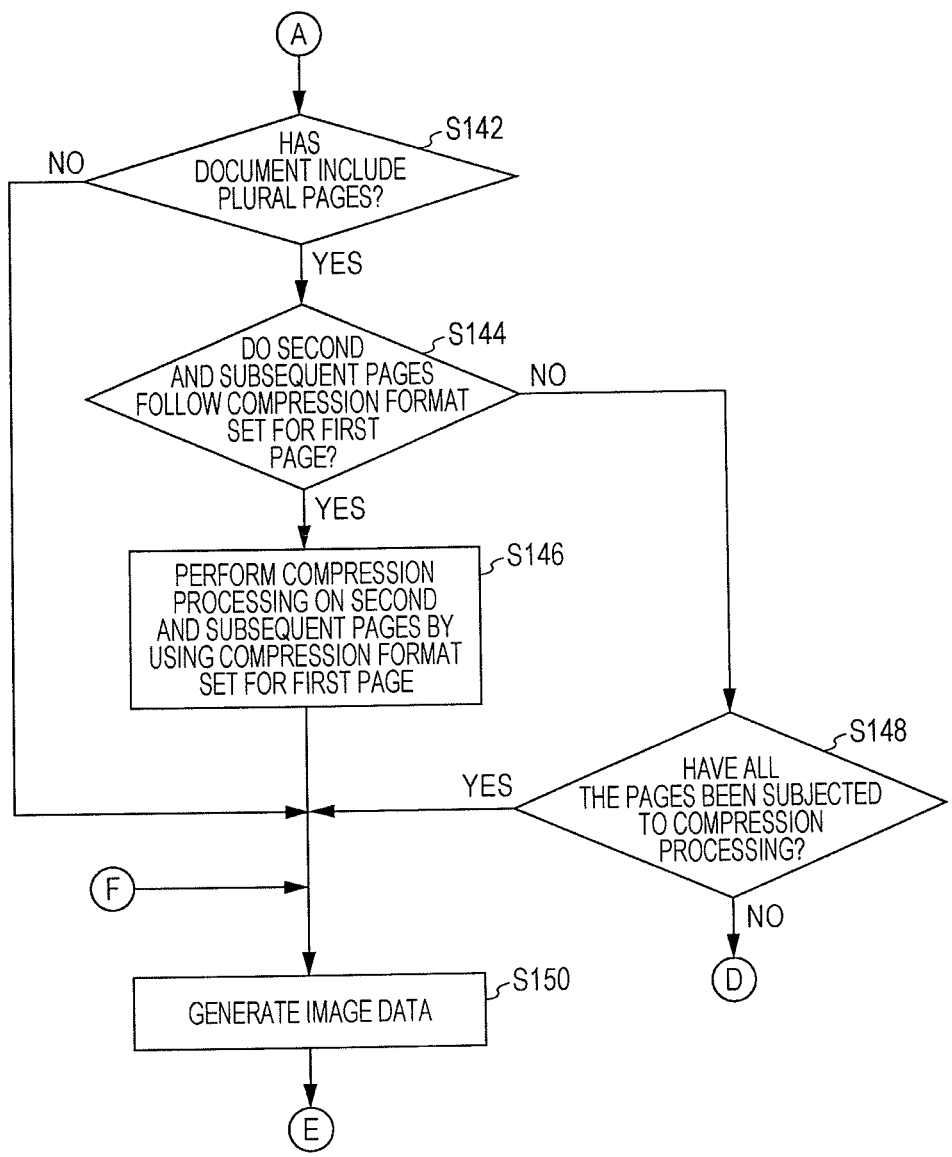

FIGS. 7A through 7C are flowcharts illustrating processing executed by the processing program 3.

In step S102, the document reading information receiver 302 receives document reading information obtained as a result of reading a document.

In step S104, the compression-format manually specifying unit 306 determines whether an instruction to compress the document reading information when generating image data has been given. If the result of step S104 is NO, the process proceeds to step S106. If the result of step S104 is YES, the process proceeds to step S108.

In step S106, the mage data generator 374 generates image data without compressing the document reading information, and the processing is completed.

In step S108, the compression-format manually specifying unit 306 determines whether the compression format has been specified. If the compression format has been specified, the process proceeds to step S110. If the compression format has not been specified, i.e., if the compression format is to be automatically set, the process proceeds to step S112.

In step S110, the compression processor 372 performs compression processing by using the specified compression format.

In step S112, the document-type determining unit 32 determines whether the document is of a specific type. If the document is of a specific type, the process proceeds to step S114. If it is determined in step S112 that the document is not of a specific type or that the type of document is undetermined, the process proceeds to step S162.

In step S114, the document-type/compression-format associating section 348 of the compression-format setting unit 34 determines whether the compression format corresponding to the document type has been specified. If the result of step S114 is YES, the process proceeds to step S116. If the result of step S114 is NO, the process proceeds to step S162.

In step S116, the document-type/compression-format associating section 348 determines whether the specified compression format is a black-and-white format. If the black-and-white format has been specified, the process proceeds to step S118. If the black-and-white format has not been specified, the process proceeds to step S120.

In step S118, the black-and-white format setting section 362 sets the compression format to be the black-and-white format, and the compression processor 372 performs compression processing by using the black-and-white format.

In step S120, the document-type/compression-format associating section 348 determines whether the specified compression format is one of the restricted-color format and the high-quality format or only color setting has been specified. If one of the restricted-color format and the high-quality format has been specified, the process proceeds to step S122. If only color setting has been specified, the process proceeds to step S172.

In step S122, the restricted-color format setting section 364 or the high-quality format setting section 366 sets the corresponding compression format, and the compression processor 372 performs compression processing by using the restricted-color format or the high-quality format.

In step S142, the plural-page setting unit 376 determines whether the document includes plural pages. If the document includes plural pages, the process proceeds to step S144. If the document includes only one page, the process proceeds to step S150.

In step S144, the plural-page setting unit 376 determines whether the second and subsequent pages follow the compression format which has been set for the first page. If the result of step S144 is YES, the process proceeds to step S146. If the result of step S144 is NO, the process proceeds to step S148.

In step S146, the compression processor 372 performs compression processing on the second and subsequent pages by using the compression format set for the first page.

In step S148, the compression processor 372 determines whether all the pages have been subjected to the compression processing. If the result of step S148 is YES, the process proceeds to step S150. If the result of step S148 is NO, the process returns to step S112.

In step S150, the image data generator 374 generates image data subjected to the compression processing. The processing is then completed.

In step S162, the most frequently appearing color determining section 354 of the compression-format setting unit 34 determines whether the proportion of the most frequently appearing colors is equal to or smaller than a threshold. If the result of step S162 is YES, the process proceeds to step S184. If the result of step S162 is NO, the process proceeds to step S164.

In step S164, the contained-color determining section 356 of the compression-format setting unit 34 determines whether the number of contained colors is equal to or greater than a threshold. If the result of step S164 is YES, the process proceeds to step S184. If the result of step S164 is NO, the process proceeds to step S166.

In step S166, the contained-color determining section 356 of the compression-format setting unit 34 determines whether the contained colors are restricted to only black and white or to colors having the color values positioned within a predetermined range starting from black or white. If the result of step S166 is YES, the process proceeds to step S180. If the result of step S166 is NO, the process proceeds to step S182.

In step S172, the most frequently appearing color determining section 354 of the compression-format setting unit 34 determines whether the proportion of the most frequently appearing colors is equal to or smaller than a threshold. If the result of step S172 is YES, the process proceeds to step S184. If the result of step S172 is NO, the process proceeds to step S174.

In step S174, the contained-color determining section 356 of the compression-format setting unit 34 determines whether the number of contained colors is equal to or greater than a threshold. If the result of step S174 is YES, the process proceeds to step S184. If the result of step S164 is NO, the process proceeds to step S182.

In step S180, the black-and-white format setting section 362 of the compression-format setting unit 34 sets the compression format to be the black-and-white format.

In step S182, the restricted-color format setting section 364 of the compression-format setting unit 34 sets the compression format to be the restricted-color format.

In step S184, the high-quality format setting section 366 of the compression-format setting unit 34 sets the compression format to be the high-quality format.

The processing executed by the processing program 3 in accordance with this exemplary embodiment will be described below by way of specific examples.

FIG. 8 illustrates a first document to be processed by the processing program 3 in accordance with this exemplary embodiment.

The first document shown in FIG. 8 is an estimate sheet. The background of the document is white, a section designated by E is red, and other characters and lines are black.

It is now assumed that the document A of the document type included in the document determining information shown in FIG. 5A is an "estimate sheet", the corresponding specific character string "AAA" is an "estimate sheet", the corresponding position information #1 indicates the "top center of the document", and the corresponding size information #1 indicates the "relatively large size (font)".

In the example shown in FIG. 8, the character string "ESTIMATE SHEET" is positioned in the top center of the document, and the size of this character string is larger than the other character strings.

Accordingly, the document-type determining unit 32 (FIG. 2) determines on the basis of the document determining information shown in FIG. 5A that the document shown in FIG. 8 is an "estimate sheet".

Then, the document-type/compression-format associating section 348 of the compression-format setting unit 34 (FIG. 4) determines which compression format is to be used for the "estimate sheet" on the basis of the document-type/compression-format association information.

For example, if the "document A" shown in FIG. 5B is the "estimate sheet", the document-type/compression-format associating section 348 sets the compression format to be the restricted-color format, and if the "document C" shown in FIG. 5B is the "estimate sheet", the document-type/compression-format associating section 348 sets the compression format to be the black-and-white format.

If the "document B" shown in FIG. 5B is the "estimate sheet", the compression format is the "color format", and the document-type/compression-format associating section 348 is unable to determine which compression format, i.e., the restricted-color format or the high-quality format, is to be used. Thus, the compression-format determining section 350 determines the compression format.

The white color occupies 90% or more of the document shown in FIG. 8, and the most frequently appearing color determining section 354 analyzes the histogram and determines that the most frequently appearing color is white and that the proportion of the white color in the document exceeds a threshold (e.g., 50%).

Further, in the document shown in FIG. 8, the contained colors are only white, black, and red (section E), and thus, the contained-color determining section 356 determines that the number of contained colors is equal to or smaller than a threshold.

Thus, the restricted-color format setting section 364 sets the compression format to be the restricted-color format.

Figure 9:
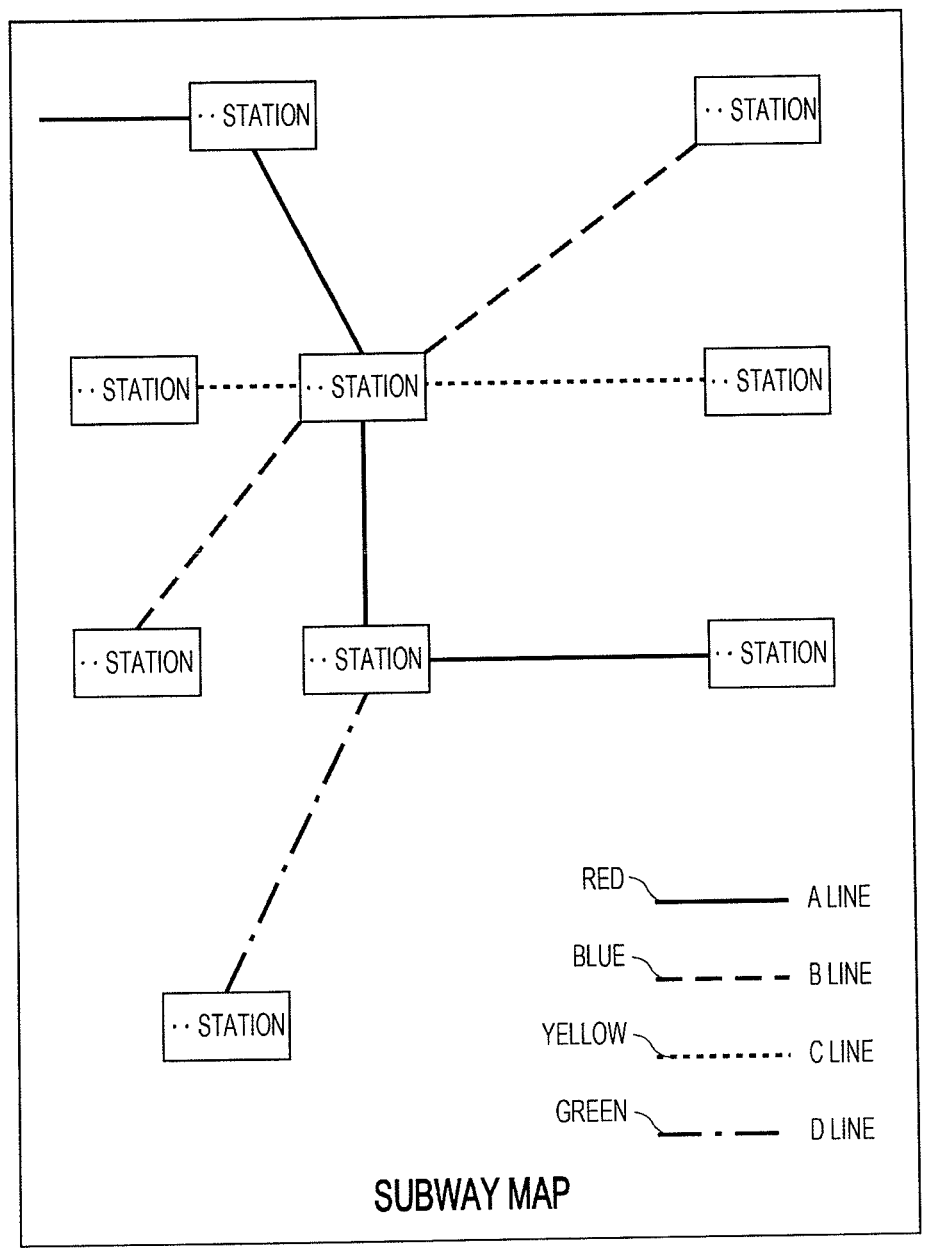
FIG. 9 illustrates a second document to be processed by the processing program in accordance with this exemplary embodiment.

FIG. 9 illustrates a second document to be processed by the processing program 3 in accordance with this exemplary embodiment.

The second document shown in FIG. 9 is a subway map including a background of white, lines of red, blue, yellow, and green, and black characters.

If the type of document shown in FIG. 9 is not contained in the document determining information shown in FIG. 5A, the document-type determining unit 32 outputs type unspecified information to the compression-format determining section 350, and the compression-format determining section 350 determines the compression format.

The white color occupies 50% or more of the document shown in FIG. 9, and the most frequently appearing color determining section 354 analyzes the histogram and determines that the most frequently appearing color is white and that the proportion of the white color in the document exceeds a threshold (e.g., 50%).

Further, in the document shown in FIG. 9, the contained colors are white, black, red, blue, yellow, and green, and thus, if the threshold is 5, the contained-color determining section 356 determines that the number of contained colors is greater than the threshold.

Thus, the high-quality format setting section 366 sets the compression format to be the high-quality format.

Figure 10:
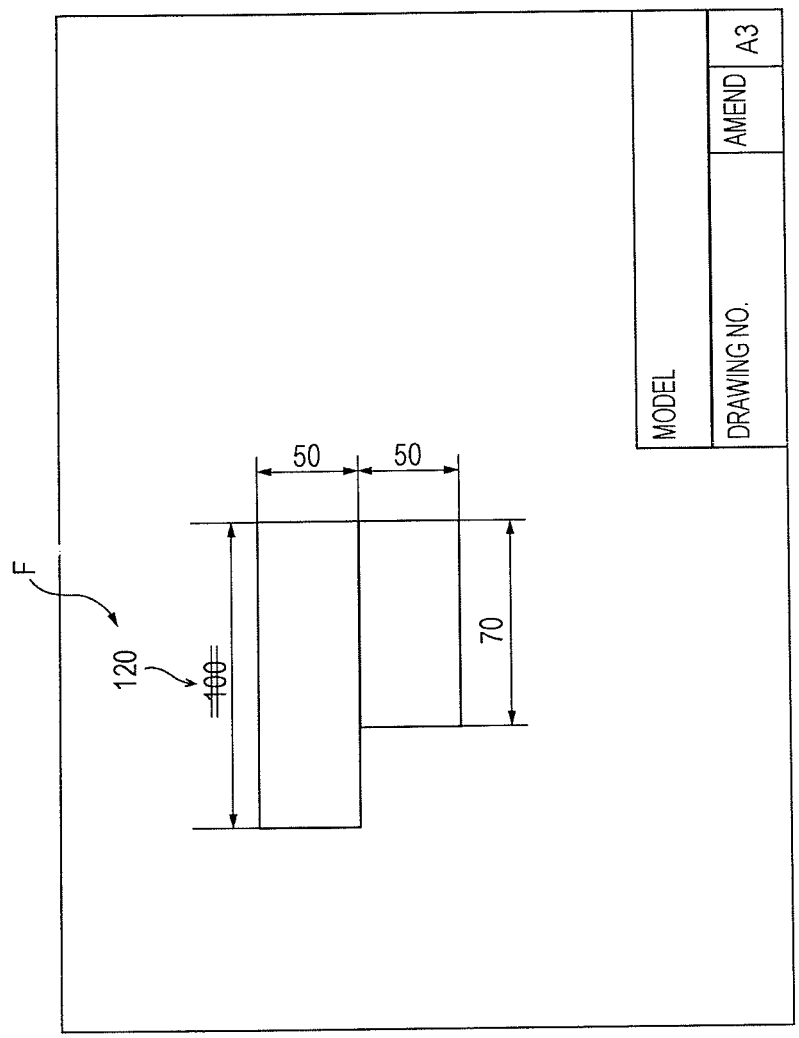
FIG. 10 illustrates a third document to be processed by the processing program in accordance with this exemplary embodiment.

FIG. 10 illustrates a third document to be processed by the processing program 3 in accordance with this exemplary embodiment.

The third document shown in FIG. 10 is a design drawing. The background of the document is white, a section designated by F (section in which the size is modified) is red, and other characters and lines are black.

It is now assumed that the document D of the document type included in the document determining information shown in FIG. 5A is a "design drawing", the corresponding specific character string "DDD" is a "drawing number", the corresponding position information #4 indicates the "within the frame at the bottom right of the document", and the corresponding size information #4 indicates the "size contained within the frame".

In the example shown in FIG. 10, the character string "drawing number" is positioned within the frame at the bottom right of the document. Accordingly, the document-type determining unit 32 determines that the document shown in FIG. 10 is a "design drawing" on the basis of the document determining information shown in FIG. 5A.

Then, the document-type/compression-format associating section 348 of the compression-format setting unit 34 determines which compression format is to be used for the "design drawing" on the basis of the document-type/compression-format association information.

For example, if the "document D" shown in FIG. 5B is a "design drawing", the document-type/compression-format associating section 348 is unable to set the compression format, and thus, the compression-format determining section 350 determines the compression format.

The white color occupies 90% or more of the document shown in FIG. 10, and the most frequently appearing color determining section 354 analyzes the histogram and determines that the most frequently appearing color is white and that the proportion of the white color in the document exceeds a threshold (e.g., 50%).

Further, in the document shown in FIG. 10, the contained colors are only white, black, and red (section F), and thus, the contained-color determining section 356 determines that the number of contained colors is equal to or smaller than a threshold.

Thus, the restricted-color format setting section 364 sets the compression format to be the restricted-color format.

Figure 11:
FIG. 11 illustrates a fourth document to be processed by the processing program in accordance with this exemplary embodiment.

FIG. 11 illustrates a fourth document to be processed by the processing program 3 in accordance with this exemplary embodiment.

The fourth document shown in FIG. 11 is a repair report. The background of the document is white, a section designated by G (printed section) is blue, a section designated by H is red, and other characters and lines are black.

If the type of document shown in FIG. 11 is not contained in the document determining information shown in FIG. 5A, the document-type determining unit 32 outputs type unspecified information to the compression-format determining section 350, and the compression-format determining section 350 determines the compression format.

The white color occupies 50% or more of the document shown in FIG. 11, and the most frequently appearing color determining section 354 analyzes the histogram and determines that the most frequently appearing color is white and that the proportion of the white color in the document exceeds a threshold (e.g., 50%).

Further, in the document shown in FIG. 11, the contained colors are only white, black, blue, and red, and thus, the contained-color determining section 356 determines that the number of contained colors is smaller than a threshold (e.g., 5).

Thus, the restricted-color format setting section 364 sets the compression format to be the restricted-color format.

Figure 12:
FIG. 12 illustrates a fifth document to be processed by the processing program in accordance with this exemplary embodiment.

FIG. 12 illustrates a fifth document to be processed by the processing program 3 in accordance with this exemplary embodiment.

The document shown in FIG. 12 includes plural documents, such as an "estimate sheet", a "design drawing", and a "repair report".

In this case, if it is determined by the plural-page setting unit 376 that the second and subsequent pages follow the compression format which has been set for the first page, the second and subsequent pages are to be compressed with the compression format which has been set for the "estimate sheet".

In contrast, if it is determined by the plural-page setting unit 376 that the compression format is to be set for each page, compression processing is performed on the individual pages by using the compression formats which have been set for the "estimate sheet", "design drawing", and "repair report".

It is noted that the color-information extracting unit 314 and the color distribution calculator 316 may perform processing only when the document-type/compression-format associating section 348 is unable to specify the compression format to be one compression format.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
at least one processor configured to implement:
a color-information extracting unit that extracts color information from an electronic document;
a compression setting unit that determines a color value that most frequently appears in the electronic document, determines color values that most frequently appear in the electronic document based on the color value, determines a proportion of the color values that most frequently appear in the electronic document to all color values that appear in the electronic document, determines whether the proportion exceeds a threshold, and sets:
a first compression format in which a number of colors contained in the electronic document is reduced to a predetermined number of colors, in response to determining that the proportion exceeds the threshold, and
a second compression format in which the number of colors in the electronic document is reduced to greater than the predetermined number of colors used in the first compression format, in response to determining that the proportion is equal to or smaller than the threshold.

2. A non-transitory computer-readable recording medium having stored thereon computer-readable codes which when executed by a processor cause the processor to execute a method of processing an image, the method comprising:
   obtaining an electronic document;
   extracting color information of the electronic document from the electronic document;
   determining a color value that most frequently appears in the electronic document;
   determining color values that most frequently appear in the electronic document based on the color value;
   determining a proportion of the color values that most frequently appear in the electronic document to all color values that appear in the electronic document;
   determining whether the proportion exceeds a threshold;
   setting a first compression format in which a number of colors contained in the electronic document is reduced to a predetermined number of colors, in response to determining that the proportion exceeds the threshold, and a second compression format in which the number of colors in the electronic document is reduced to greater than the predetermined number of colors used in the first compression format, in response to determining that the proportion is equal to or smaller than the threshold; and
   compressing the electronic document according to the set compression format.

3. A non-transitory computer-readable recording medium having stored thereon computer-readable codes which when executed by a processor cause the processor to execute a method of processing an image, the method comprising:
   obtaining an electronic document;
   extracting color information of the electronic document from the electronic document;
   determining a most frequent color value that most frequently appears in the electronic document among color values in the electronic document;
   determining most frequent color values that most frequently appear in the electronic document among the color values in the electronic document, based on the most frequent color value;
   determining to compress the electronic document according to one of a first compression format and a second compression format based on an amount in the electronic document of the most frequent color value;
   compressing the electronic document according to the determined one of the first compression format and the second compression format,
   wherein the amount in the electronic document of the most frequent color value comprises an amount in the electronic document of the most frequent color values that most frequently appear in the electronic document among the color values in the electronic document, and
   wherein the determining to compress comprises:
      determining a ratio of the amount in the electronic document of the most frequent color values to an amount of the color values in the electronic document;
      comparing the ratio to a threshold value; and
      determining to compress the electronic document according to the one of the first compression format and the second compression format based on a result of the comparing.

4. The non-transitory computer-readable recording medium according to claim 3, wherein determining the ratio comprises:
   generating a histogram of the color values in the electronic document;
   analyzing frequencies of appearance in the histogram of the color values in the electronic document;
   selecting a color value among the color values in the electronic document having a highest frequency of appearance among the frequencies of appearance as the most frequent color value;
   selecting color values among the color values in the electronic document having highest frequencies of appearance among the frequencies of appearance within a predetermined range of the most frequent color value in the histogram as the most frequent color values;
   determining the amount in the electronic document of the most frequent color values based on the histogram; and
   determining the ratio of the amount in the electronic document of the most frequent color values to the amount of the color values in the electronic document based on the histogram.

5. The non-transitory computer-readable recording medium according to claim 4, wherein the color values are pixel values.

* * * * *